US010838935B2

(12) United States Patent
Olivieri et al.

(10) Patent No.: US 10,838,935 B2
(45) Date of Patent: *Nov. 17, 2020

(54) AUTOMATING THE LOGGING OF TABLE CHANGES IN A DATABASE

(71) Applicant: International Business Machines Corporation, Armonk, NY (US)

(72) Inventors: Ricardo N. Olivieri, Austin, TX (US); Mark B. Whelan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 417 days.

This patent is subject to a terminal disclaimer.

(21) Appl. No.: 15/822,351

(22) Filed: Nov. 27, 2017

(65) Prior Publication Data
US 2018/0075071 A1     Mar. 15, 2018

Related U.S. Application Data

(63) Continuation of application No. 13/297,063, filed on Nov. 15, 2011, now Pat. No. 9,892,137, and a continuation of application No. 11/035,262, filed on Jan. 13, 2005, now Pat. No. 8,103,624.

(51) Int. Cl.
    *G06F 7/00*       (2006.01)
    *G06F 16/21*     (2019.01)
    *G06F 16/23*     (2019.01)
    *G06F 16/28*     (2019.01)

(52) U.S. Cl.
    CPC ........ *G06F 16/219* (2019.01); *G06F 16/2358* (2019.01); *G06F 16/284* (2019.01)

(58) Field of Classification Search
    CPC ............................ G06F 16/219; G06F 16/284

USPC ......................................................... 707/609
See application file for complete search history.

(56) References Cited

U.S. PATENT DOCUMENTS

| | | |
|---|---|---|
| 5,355,474 A | 10/1994 | Thuraisngham et al. |
| 6,182,121 B1 | 1/2001 | Wlaschin |
| 6,321,236 B1 | 11/2001 | Zollinger |
| 6,336,114 B1 | 1/2002 | Garrison |
| 6,366,921 B1 * | 4/2002 | Hansen ................. G06F 16/289 |

(Continued)

OTHER PUBLICATIONS

Office Action, dated May 1, 2007 regarding U.S. Appl. No. 11/035,262, 10 pages.

(Continued)

*Primary Examiner* — Eliyah S. Harper
(74) *Attorney, Agent, or Firm* — Yee & Associates, P.C.

(57) ABSTRACT

A system and method for logging changes to a database table are disclosed. The system comprises an administration tool, table metadata, a history table, and a service engine. The administration tool provides an interface through which a database administrator (DBA), database programmer, or other user can manage the table metadata and the history table, including the selection of columns within the table for which the system will track changes. In the preferred embodiment, the service engine is a middleware application that tracks changes for the selected columns. The service engine processes all user-requested database operations and adds operations to manage the history table before relaying the request operations to a DBMS. Alternatively or additionally, the service engine may be a wrapper to existing services that the database application provides.

18 Claims, 2 Drawing Sheets

(56) References Cited

U.S. PATENT DOCUMENTS

| | | | |
|---|---|---|---|
| 6,374,252 B1* | 4/2002 | Althoff | G06F 16/258 |
| 6,487,557 B1 | 11/2002 | Nagatomo | |
| 6,631,374 B1 | 10/2003 | Klein et al. | |
| 6,671,811 B1 | 12/2003 | Diep et al. | |
| 7,043,473 B1* | 5/2006 | Rassool | H04N 5/913 |
| 7,085,757 B2 | 8/2006 | Dettinger et al. | |
| 7,266,702 B2 | 9/2007 | Hotti | |
| 7,296,008 B2 | 11/2007 | Passerini et al. | |
| 7,529,753 B1* | 5/2009 | Ewing | G06F 16/252 |
| 7,539,988 B1* | 5/2009 | Hersh | G06F 9/466 718/100 |
| 7,613,994 B2 | 11/2009 | Wason | |
| 7,716,170 B2 | 5/2010 | Farag | |
| 8,103,624 B2 | 1/2012 | Olivieri et al. | |
| 2002/0133492 A1 | 9/2002 | Goldstein et al. | |
| 2002/0143732 A1* | 10/2002 | Teng | G06F 16/20 |
| 2003/0105757 A1 | 6/2003 | Mongrola | |
| 2003/0154197 A1 | 8/2003 | Millet et al. | |
| 2003/0172046 A1 | 9/2003 | Scott | |
| 2003/0212647 A1 | 11/2003 | Bangel et al. | |
| 2003/0225798 A1 | 12/2003 | Norcott | |
| 2004/0015469 A1 | 1/2004 | Beier et al. | |
| 2004/0193952 A1 | 9/2004 | Narayanan et al. | |
| 2004/0210606 A1 | 10/2004 | Brown et al. | |
| 2004/0221116 A1* | 11/2004 | Hu | G06F 16/284 711/158 |
| 2005/0060342 A1 | 3/2005 | Farag | |
| 2005/0071194 A1* | 3/2005 | Bormann | G16H 10/60 705/2 |
| 2005/0131964 A1 | 6/2005 | Saxena | |
| 2005/0131966 A1 | 6/2005 | Lou | |
| 2005/0135239 A1* | 6/2005 | Cromer | H04W 48/02 370/229 |
| 2005/0234936 A1* | 10/2005 | Castro | G06F 16/27 |
| 2012/0059791 A1 | 3/2012 | Olivieri et al. | |

OTHER PUBLICATIONS

Final Office Action, dated Oct. 16, 2007, regarding U.S. Appl. No. 11/035,262, 9 pages.
Notice of Allowance, dated Sep. 16, 2011, regarding U.S. Appl. No. 11/035,262, 7 pages.
Office Action, dated Nov. 19, 2015, regarding U.S. Appl. No. 13/297,063, 19 pages.
Final Office Action, dated Jul. 15, 2016, regarding U.S. Appl. No. 13/297,063, 14 pages.
Office Action, dated May 10, 2017, regarding U.S. Appl. No. 13/297,063, 29 pages.
Notice of Allowance, dated Oct. 5, 2017, regarding U.S. Appl. No. 13/297,063, 14 pages.
List of IBM Patents Treated as Related, dated Nov. 21, 2017, 2 pages.

* cited by examiner

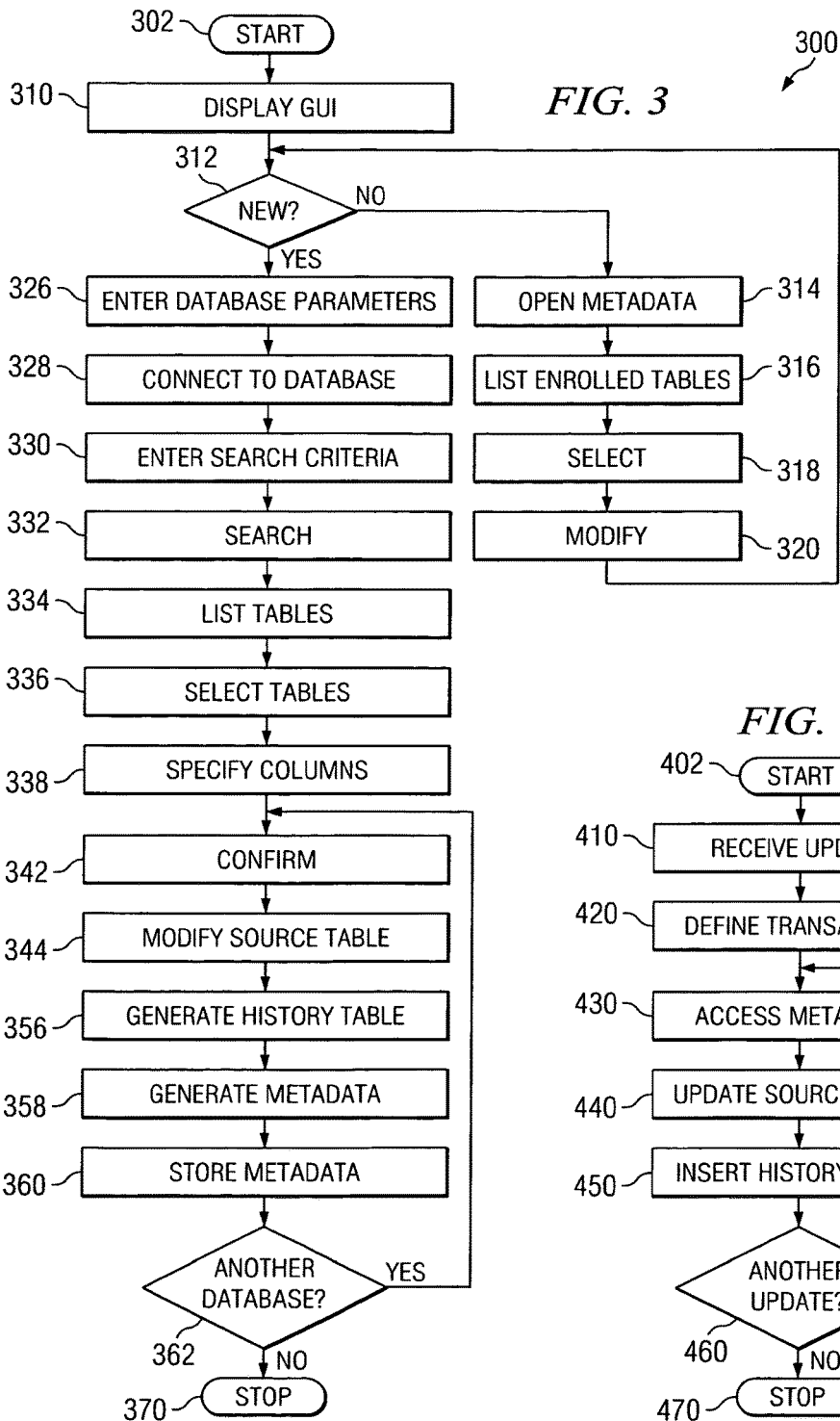

AUTOMATING THE LOGGING OF TABLE CHANGES IN A DATABASE

This application is a continuation of application Ser. No. 11/035,262 filed Jan. 13, 2005, status allowed.

FIELD OF THE INVENTION

The field of the invention is data processing in general, and specifically database processing that generates a record of changes to database tables.

BACKGROUND OF THE INVENTION

In general, a database is any collection of information organized for rapid search and retrieval. A database stored in a computer-readable medium commonly is modeled as a collection of one or more tables. Each table, in turn, is modeled as a collection of one or more records (referred to commonly as a "row"), and each record as a collection of one or more fields (referred to commonly as a "column").

Generally, three types of users interact with a database: database administrators (DBAs), database programmers, and end-users. Each type of user interacts with a database through database management systems (DBMS), which are sophisticated server programs that directly manipulate data within a database. Most modern DBMSs support a standard structured query language (SQL), through which a user can specify exactly what information a database should store or retrieve for the user.

A DBA is responsible primarily for managing the information in a database. A DBA determines what goes into the database, how the database is structured and how information in the database is accessed. A DBA also determines how the database is secured and how the integrity of the database is checked and maintained. The DBA also monitors the database performance.

In contrast, a database programmer is primarily responsible for creating computer programs through which end-users can manipulate and apply to the data in a database to accomplish a specific task. Such programs (referred to herein as "database applications") interact with a database through a DBMS within the constraints that the DBA has established. Database applications often use SQL or some minor variation adapted for use in such programs.

For many years, database programmers have developed "client" database applications that interact directly with a DBMS server. In general, these database applications provide a user interface to the DBMS and implement an enterprise's business rules for a particular application, such as entering a customer's order for products. The enterprise data, though, remained relatively centralized and available to multiple clients through the DBMS. In recent years, this traditional "two-tier" client/server system has been displaced slowly by more sophisticated multi-tier client/server systems. In general, a multi-tier system places at least one intermediate component between the client and the server. These components are referred to commonly as "middleware." Programmers often use multiple client/server tiers to separate and delegate particular programming tasks. In particular, one tier usually provides a user interface, while a second tier implements an enterprise's business rules. A third tier generally implements the underlying data processing (such as creating a data structure to represent a customer's order in a database).

Regardless of architecture, though, most database applications frequently insert, modify, or delete data in the tables of a database. A history of these actions is often useful to administrators, auditors, and other analysts within an enterprise. Thus, many database applications record such actions in a log. A log may take many forms, but the most common include a separate table within the database itself and simple text files stored in the file systems somewhere. Although distinct database applications may share a single log, each database application generally is responsible for implanting a process for recording its own changes in the log. Consequently, each database programmer must write code that processes and records table changes in a log.

Of course, not only is it useful to record the history of changes to a database, but it is also sometimes useful to record the user that caused the changes and the time at which the changes occurred. In order to identify the user and time, database applications usually insert the user name and timestamp into each action.

The practical applications for change logs abound, as exemplified in U.S. Pat. No. 6,321,236 (the '236 patent). The '236 patent discloses a technique for storing table differences that are used to make client copies of a particular database table current. A client receives a client copy of a table having a version identifier. Later, the client requests synchronization of the client copy with the original database table on the server. The version identifier of the client copy of the database engine is accessed and all intervening updates are translated into instructions that are understood by the type of database engine run on the client system.

U.S. Pat. No. 6,631,374 (the '374 patent) also discloses a system in which changes to a database are important. Specifically, the '374 patent discloses a system and method for temporarily accessing data values in a database as of a requested query time. Whenever a transaction makes a change to a relative database block, the database engine creates an interested transaction entry, which is stored in the relative database block. A record of database operations is kept that includes transactions effecting row data changes.

Finally, United States application 2003/0212647 (the '647 application) discloses a method and system for maintaining a change history for a database design. More particularly, the '647 application allows change history data corresponding to a database design change to be automatically transmitted to the changed database.

While the concept of database change logs is not new, there currently is no convenient mechanism for centrally recording and managing such information. As already noted, database programmers must implement change log management in every conventional database application in which such information is desired. Clearly, any system that could eliminate this redundant and time consuming programming effort would have an immediate impact on development and administration costs, and contribute significantly to the advancement of this technical field. Those skilled in this art should appreciate the utility of the following detailed description of a novel system that addresses this need.

SUMMARY OF THE INVENTION

The invention that meets the needs identified above is a system and method for logging changes to a database table. The system comprises an administration tool, table metadata, a history table, and a service engine. The administration tool provides an interface through which a DBA, database programmer, or other user can manage the table metadata and the history table, including the selection of columns within the table for which the system will track changes. In the preferred embodiment, the service engine is a middleware application that tracks changes for the selected columns. The service engine processes all user-requested database operations and adds operations to manage the history table before relaying the request operations to a DBMS. Alternatively, the service engine may be a wrapper to existing services that the database application provides.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 3 is a flow chart of the logic of the Administration Tool; and

FIG. 4 is a flow chart of the logic of the Service Engine (SE).

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs.

Figure 1:
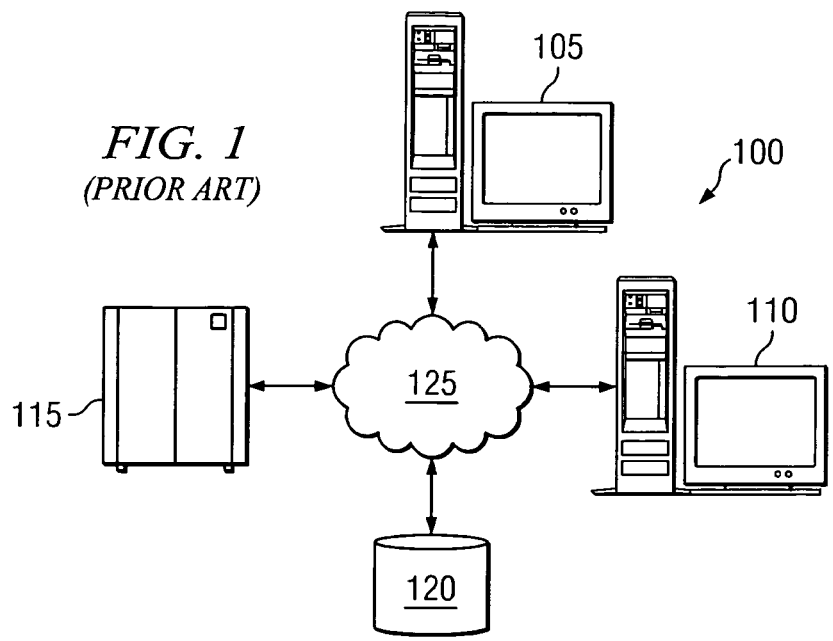
FIG. 1 illustrates an architecture for connecting various hardware devices to create a network for transferring data.

Additionally, the invention is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
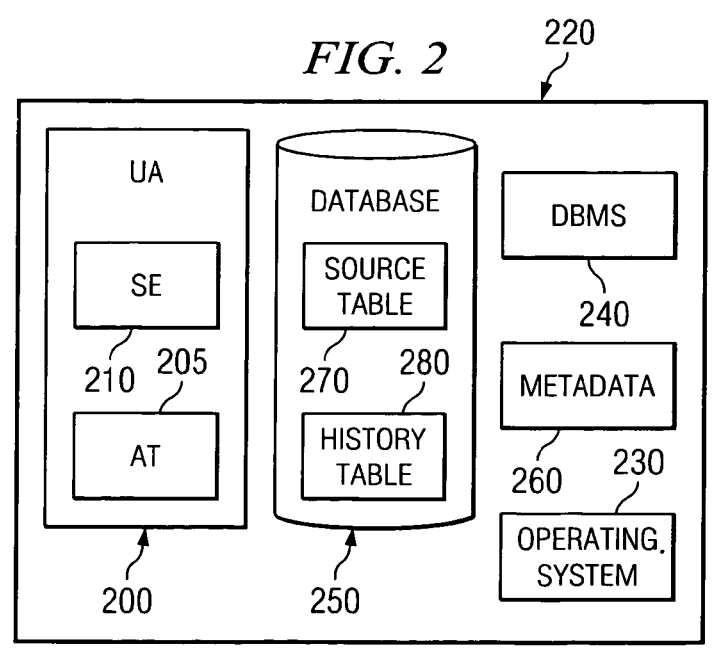
FIG. 2 is a diagram illustrating one embodiment of the internal configuration of a computer.

Update Application (UA) 200 comprises Administration Tool (AT) 205 and Service Engine (SE) 210. UA 200 typically is stored in a memory, represented schematically as memory 220 in FIG. 2. The term "memory," as used herein, includes without limitation any volatile or persistent medium, such as an electrical circuit, magnetic disk, optical disk, or any storage device in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to UA 200, memory 220 includes operating system 230, DBMS 240, database 250, and metadata 260, with which UA 200 interacts.

In general, database 250 initially comprises at least one table, such as source table 270. As used herein, the term "source table" refers to any table designed to hold substantive data, as opposed to data that represents the change history of another table. An administrator of database 250 then enrolls source table 270 into UA 200. Although the administrator may manually enroll source table 270, the process preferably is implemented in AT 205 as described below with reference to FIG. 3. Moreover, for the sake of simplicity, the term "administrator" is used below to describe a preferred method of using AT 205, but it should be readily apparent to those skilled in the art that an administrator can delegate or otherwise authorize any other user, particularly a database programmer, to use AT 205 in much the same way.

Referring to FIG. 3, AT 205 starts (302) and displays a graphical user interface (GUI) (not shown) (310) to the administrator. The administrator then indicates an intention to enroll a new source table or modify a previously enrolled source table (312). If a new source table is to be enrolled, AT 205 prompts the administrator to enter parameters necessary for connecting to database 250 (326). Necessary parameters may include without limitation the database host name, database name, user identification, password, or other parameter by which AT 205 can locate and connect to database 250. AT 205 then uses the parameters to connect to database 250 (328). AT 205 then prompts the administrator to enter search criteria (330) to limit the number of tables in the list. Search criteria may include without limitation schema names, table spaces names, and so forth. Alternatively, the administrator may specify all tables as the criteria. Responsive to receiving the criteria, AT 205 uses the search criteria to search database 250 (332). AT 205 then lists all tables that meet the search criteria (334). AT 205 prompts the administrator to select one or more tables, from the displayed list, for which the administrator wants to track changes (336). Responsive to the administrator's selections, AT 205 prompts the administrator to select specific columns that should be tracked (338). If the administrator does not select any specific columns, AT 300 includes all columns by default. AT 205 then prompts the administrator to confirm the selections (342). Assuming for illustrative purposes that the administrator has selected source table 270, upon the administrator's confirmation, AT 205 adds two columns to source table 270 (344). AT 205 adds one column to record the identification of any user that updates a table. AT 205 adds a second column to record the time at which a user updates a record in source table 270. AT 205 then prompts the administrator to specify names for the two columns. If the administrator does not specify names for the columns, then AT 205 provides default values that do not conflict with existing column names of source table 270.

If no user has previously enrolled source table 270, then AT 205 generates a new history table, represented as history table 280 (see FIG. 2) (356). AT 205 then generates metadata 260 (358). Metadata 260 maps the selected columns in source table 270 to columns in history table 280, including the names of the columns that SE 210 will use for recording the identification of any user that updates source table 270 and for recording the time at which an update occurs. AT 205 then saves metadata 260 to persistent storage (360), such as a file or a database table, which SE 210 will access during the execution of the database application. As FIG. 3 indicates, AT 205 continues until the administrator indicates that all tables have been enrolled (362).

If at step 312, the administrator indicates an intention to modify or remove a previously enrolled table, AT 205 reads metadata 260 (314) and lists any previously enrolled tables (316). AT 205 then prompts the administrator to select a previously enrolled table from the list (318). The administrator can then modify metadata 260 associated with the selected table. As used herein, "modify" means to remove or alter the selection or mapping of columns in metadata 260 (320). AT 205 then returns to step 312.

After the administrator configures metadata 260, source table 270, and history table 280, a database programmer no longer has to manually implement code that tracks changes to source table 270. Rather, the database programmer merely has to program a database application to direct database operations to SE 210 instead of DBMS 240. Then, when the database application later executes, SE 210 processes the operation as described below with reference to FIG. 4.

In one preferred embodiment, SE 210 is a middleware application that receives and processes database operations before relaying the operations to a DBMS, such as DBMS 240. Alternatively, or additionally, SE 210 also may be implemented as a wrapper to a DBMS. In either embodiment, though, SE 210 operates substantially as follows. SE 210 starts (402) and receives a request from a database application to execute an operation on source table 270 (410). Generally, the database application sends requests in the form of an SQL statement. SE 210 preferably allows the database application to demarcate database operations as transactions (420). In such an embodiment, the database application only needs to identify the user once per transaction, rather than identifying the user as an SQL parameter in every SQL update statement.

SE 210 then reads metadata 260 (430) to identify columns in history table 280 that map to columns in source table 270 that are affected by the pending database operation. Generally, SE 210 uses metadata 260 and parameters which the database application passes to it, such as table name, column names, and column value types, to generate SQL for updating source table 270 and to generate SQL statements to record the changes to source table 270 in history table 280. The SQL update statement for source table 270 includes the user name provided for the transaction and a current timestamp. The column names for these fields are obtained from metadata 260. SE 210 then propagates the pending changes to source table 270, either directly or through DBMS 240 (440). SE 210 then records the changes to the appropriately mapped columns in history table 280 (450). SE 210 determines whether there is another update (460). If so, SE 400 goes to step 410. If not, SE 400 stops (470).

If at step 430, metadata 260 is not found, then the user name/timestamp combination is not stored and no SQL statements are created for history table 280. In other words, when metadata for a table is not found, the service engine assumes that the table was not enrolled.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for updating a database table, the method comprising:
   a computer receiving, from a database application, a request to execute an operation on a first table in a database, wherein the computer uses one of a middleware application which receives the request and processes a database operation before relaying the database operation to a database management system (DBMS) or a wrapper to the DBMS which receives the request and processes the database operation before relaying the database operation to the DBMS;
   the computer identifying a column in the first table in which a change would be entered during execution of the operation on the first table, wherein the operation is a pending database operation, and wherein the column identified is a tracked column for the change;
   the computer identifying, from metadata, a column in a second table that maps to the column in the first table in which the change would be entered during execution of the pending database operation on the first table;
   the computer forming a change history of the first table in the second table by recording the change in the column of the second table; and
   responsive to forming the change history, the computer sending the request to the database management system (DBMS) to execute the pending database operation on the first table.

2. The method of claim 1, further comprising:
   before sending the request to the DBMS to execute the pending database operation on the first table, the computer creating a structured query language (SQL) statement comprising a user name and a password; and
   the computer providing the SQL statement to the DBMS to update the first table.

3. The method of claim 1, further comprising:
   before the step of the computer recording the change in the column of the second table, the computer creating a structured query language (SQL) statement to record the change in the column of the second table.

4. The method of claim 1, further comprising:
   the computer generating the metadata, the metadata comprising a mapping between the tracked column in the first table and the column in the second table.

5. The method of claim 1, further comprising:
   the computer adding a user identification column and a timestamp column to the first table.

6. The method of claim 5, further comprising:
   the computer generating the metadata, the metadata comprising a mapping between the tracked column in the first table and the column in the second table, a mapping between the user identification column in the first table and a user identification column in the second table, and a mapping between the timestamp column in the first table and a timestamp column in the second table.

7. A computer system for updating a database table, the computer system comprising:

one or more processors, one or more computer-readable memories and one or more computer-readable tangible storage devices;

program instructions, stored on at least one of the one or more computer-readable tangible storage devices for execution by at least one of the one or more processors via at least one of the one or more memories, to receive, from a database application, a request to execute an operation on a first table in a database, wherein the computer system uses one of a middleware application which receives the request and processes a database operation before relaying the database operation to a database management system (DBMS) or a wrapper to the DBMS which receives the request and processes the database operation before relaying the database operation to the DBMS;

program instructions, stored on at least one of the one or more computer-readable tangible storage devices for execution by at least one of the one or more processors via at least one of the one or more memories, to identify a column in the first table in which a change would be entered during execution of the operation on the first table, wherein the operation is a pending database operation, and wherein the column identified is a tracked column for the change;

program instructions, stored on at least one of the one or more computer-readable tangible storage devices for execution by at least one of the one or more processors via at least one of the one or more memories, to identify, from metadata, a column in a second table that maps to the tracked column in the first table in which the change would be entered during execution of the pending database operation on the first table;

program instructions, stored on at least one of the one or more computer-readable tangible storage devices for execution by at least one of the one or more processors via at least one of the one or more memories, to form a change history of the first table in the second table by recording the change in the column of the second table; and program instructions, stored on at least one of the one or more computer-readable tangible storage devices for execution by at least one of the one or more processors via at least one of the one or more memories, to send, responsive to forming the change history, the request to the DBMS to execute the operation on the first table.

8. The computer system of claim 7, further comprising:
program instructions, stored on at least one of the one or more computer-readable tangible storage devices for execution by at least one of the one or more processors via at least one of the one or more memories, to, before sending the request to the DBMS to execute the pending database operation on the first table, create a structured query language (SQL) statement comprising a user name and a password; and program instructions, stored on at least one of the one or more computer-readable tangible storage devices for execution by at one of the one or more processors via at least one of the one or more memories, to send the SQL statement to the DBMS to update the first table.

9. The computer system of claim 7, further comprising:
program instructions, stored on at least one of the one or more computer-readable tangible storage devices for execution by at least one of the one or more processors via at least one of the one or more memories, to, before recording the change in the column of the second table, create a structured query language (SQL) statement to record the change in the column of the second table.

10. The computer system of claim 7, further comprising:
program instructions, stored on at least one of the one or more computer-readable tangible storage devices for execution by at least one of the one or more processors via at least one of the one or more memories, to generate the metadata, the metadata comprising a mapping between the tracked column in the first table and the column in the second table.

11. The computer system of claim 7, further comprising:
program instructions, stored on at least one of the one or more computer-readable tangible storage devices for execution by at least one of the one or more processors via at least one of the one or more memories, to add a user identification column and a timestamp column to the first table.

12. The computer system of claim 11, further comprising:
program instructions, stored on at least one of the one or more computer-readable tangible storage devices for execution by at least one of the one or more processors via at least one of the one or more memories, to generate the metadata, the metadata comprising a mapping between the tracked column in the first table and the column in the second table, a mapping between the user identification column in the first table and a user identification column in the second table, and a mapping between the timestamp column in the first table and a timestamp column in the second table.

13. A computer program product for updating a database table, the computer program product comprising:
one or more computer-readable tangible storage devices;
program instructions, stored on at least one of the one or more computer-readable tangible storage devices, to receive, from a database application, a request to execute an operation on a first table in a database, wherein a computer uses one of a middleware application which receives the request and processes a database operation before relaying the database operation to a database management system (DBMS) or a wrapper to the DBMS which receives the request and processes the database operation before relaying the database operation to the DBMS;

program instructions, stored on at least one of the one or more computer-readable tangible storage devices, to identify a column in the first table in which a change would be entered during execution of the operation on the first table, wherein the operation is a pending database operation, and wherein the column identified is a tracked column for the change;

program instructions, stored on at least one of the one or more computer-readable tangible storage devices, to identify, from metadata, a column in a second table that maps to the tracked column in the first table in which the change would be entered during execution of the pending database operation on the first table;

program instructions, stored on at least one of the one or more computer-readable tangible storage devices, to form a change history of the first table in the second table by recording the change in the column of the second table; and program instructions, stored on at least one of the one or more computer-readable tangible storage devices, to send, responsive to forming the change history, the a request to the DBMS to execute the operation on the first table.

14. The computer program product of claim 13, further comprising:
   program instructions, stored on at least one of the one or more computer-readable tangible storage devices, to, before sending the request to the DBMS to execute the pending database operation on the first table, create a structured query language (SQL) statement comprising a user name and a password; and
   program instructions, stored on at least one of the one or more computer-readable tangible storage devices, to send the SQL statement to the DBMS to update the first table.

15. The computer program product of claim 13, further comprising:
   program instructions, stored on at least one of the one or more computer-readable tangible storage devices, to, before recording the change in the column of the second table, create a structured query language (SQL) statement to record the change in the column of the second table.

16. The computer program product of claim 13, further comprising:
   program instructions, stored on at least one of the one or more computer-readable tangible storage devices, to generate the metadata, the metadata comprising a mapping between the tracked column in the first table and the column in the second table.

17. The computer program product of claim 13, further comprising:
   program instructions, stored on at least one of the one or more computer-readable tangible storage devices, to add a user identification column and a timestamp column to the first table.

18. The computer program product of claim 17, further comprising:
   program instructions, stored on at least one of the one or more computer-readable tangible storage devices, to generate the metadata, the metadata comprising a mapping between the tracked column in the first table and the column in the second table, a mapping between the user identification column in the first table and a user identification column in the second table, and a mapping between the timestamp column in the first table and a timestamp column in the second table.

* * * * *